United States Patent [19]
Lin et al.

[11] Patent Number: 5,580,416
[45] Date of Patent: Dec. 3, 1996

[54] MANDREL ASSEMBLY

[75] Inventors: Chin-I Lin, Yung Kang; Chung-Lin Wu, Hsinchu; Rong-Shian Liu, Hsinchu; Gou-Don Chu, Hsinchu, all of Taiwan

[73] Assignee: Industrial Technology Research Institute, Taiwan

[21] Appl. No.: 381,038

[22] Filed: Jan. 31, 1995

[51] Int. Cl.$^6$ ........................................... B65H 81/00
[52] U.S. Cl. .................... 156/425; 156/169; 156/173; 156/175; 156/189; 249/67; 249/175
[58] Field of Search ................................. 156/425, 169, 156/173, 175, 189; 242/174, 175, 176; 249/67, 175, 180; 464/181, 183, 903

[56] References Cited

U.S. PATENT DOCUMENTS

| | | | |
|---|---|---|---|
| 1,721,253 | 7/1929 | Loughead et al. | 156/425 X |
| 3,156,598 | 11/1964 | Martin | 156/175 X |
| 3,765,979 | 10/1973 | Thomas | 156/173 |
| 4,130,451 | 12/1978 | Hamilton et al. | 156/425 X |
| 4,448,624 | 5/1984 | Webber | 156/175 |
| 4,684,423 | 8/1987 | Brooks et al. | |
| 5,071,506 | 12/1991 | Nelsone et al. | 156/175 X |
| 5,192,384 | 3/1993 | Barrier et al. | 156/189 |
| 5,259,901 | 11/1993 | Davis et al. | |
| 5,261,980 | 11/1993 | Pearce | 156/425 X |
| 5,306,371 | 4/1994 | Ramey | 156/425 X |
| 5,352,309 | 10/1994 | Oswald | 156/175 X |

FOREIGN PATENT DOCUMENTS

| | | | |
|---|---|---|---|
| 2821677 | 11/1979 | Germany | 464/181 |

*Primary Examiner*—Jeff H. Aftergut
*Attorney, Agent, or Firm*—Barnes, Kisselle, Raisch, Choate, Whittemore & Hulbert, P.C.

[57] ABSTRACT

A mandrel assembly has a hollow main tube and two annular sleeves, wherein an inner diameter of the two annular sleeves is larger than an outer diameter of the two main tube ends. The two annular sleeves are sleeved respectively on the two main tube ends, which can be easily disengaged from the mandrel assembly when applied with an external force.

22 Claims, 9 Drawing Sheets

MANDREL ASSEMBLY

FIELD OF THE INVENTION

This invention relates to a mandrel assembly, especially to a mandrel assembly for use in a filament winding method.

BACKGROUND OF THE INVENTION

A filament winding method is to equally align the fiber bundle, wet the fiber bundle in a resin bath, regularly wind it in an assigned pattern, thickness and weight on a rotating mandrel, and cure and then strip the wound fiber bundle off the mandrel or strip off and then cure the wound fiber bundle on the mandrel.

Early products, e.g., a rocket engine cowling, a pressure vessel, a buoy, a conical tip of a missile, a storage tank, a cylindrical tube, a motor vane spring, a helicopter propeller, a spaceship spar, an airplane fuselage and other aerospace or industrial component parts, were made mainly in a cylindrical outline. After the fiber wetted with resin is wound on the mandrel in an assigned pattern, one has to cure the resin carried on the fiber with heat and then draw off the no longer required mandrel. So, the mandrel should be made of a material that is soluble or has a low melting point (but still higher than the curing temperature of the resin) in order to pre-form the outline and size of a product, e.g., a golf club. The filament winding process for making a carbon fiber golf club is to wind a fiber that has been wetted in a resin bath in an assigned pattern on a conical iron core (i.e., a mandrel) mounted in a winding machine, and then wrap a heat shrinkable tape layer on the wound fiber such that the fiber wetted with the resin can be tightly formed on the mandrel and the fiber can be cured in an oven. After stripping off the tape layer and the mandrel, the wound fiber is ground to a required outer diameter in a centerless grinding machine to obtain a prototype of the golf club. However, we cannot manufacture sporting products such as bicycle handle bars, bicycle front forks, tennis rackets or badminton rackets that have complex outlines, varying cross-sectional sizes or unsymmetrical straight cylindrical tubes by using the shrinkable tape and applying the same curing procedure as used for a golf club. Instead, one has to use a mandrel that has an inflatable bladder inside by blowing up the mandrel to pressurize, harden and form a product. Consequently, it is necessary to remove the mandrel before the wound fiber can be cured.

Figure 1:
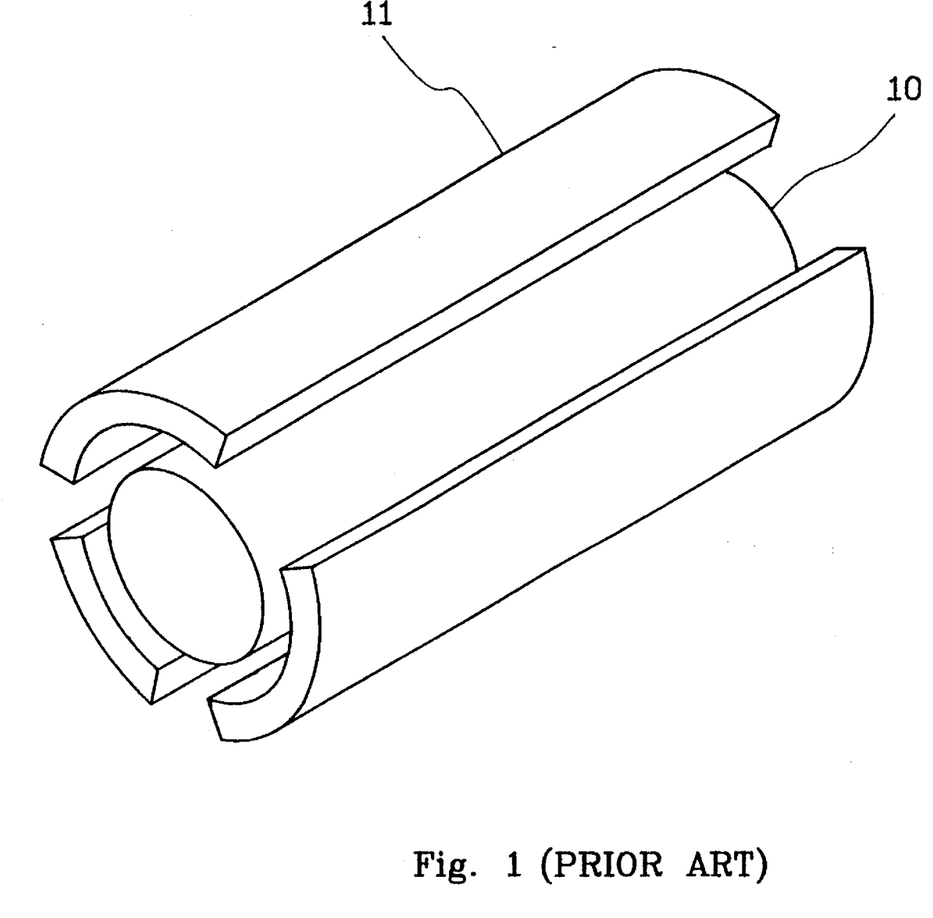
FIG. 1 is a schematic view showing conventional mandrel components.

A conventional filament winding method is to wind a fiber wetted with resin in an assigned pattern on an extractable mandrel, cure the wound fiber and then extract the mandrel. This, however, is not suitable for the aforementioned product having a complex outline, generally, for a product having a special requirement, the fiber is wound in an assigned pattern on a mandrel which is then heated until the resin carried on the fiber does not contaminate the operator's hand (i.e., a B-stage of resin). The wound fiber is then stripped off the mandrel and put in an oven to be cured and formed. The design of a mandrel for products having complex outlines, varying cross-sectional sizes and unsymmetrical straight cylindrical tubes is therefore important. Conventional extractable mandrel designs, e.g., illustrated in U.S. Pat. Nos. 4,448,624, 4,684,423 and No. 5,259,901, are different from the present invention in both the configuration and the usage. Moreover, the mandrel used in a prior art manufacturing process, as shown in FIG. 1, has a uniformly cross-sectional iron core 10 encapsulated with two or three long arc strip shells 11. After sleeving an inflatable bladder on such a mandrel, one may wind a fiber wetted with resin in an assigned pattern on the mandrel that is mounted in a winding machine. Thereafter, the wound fiber, the arc strip shells 11 and the iron core 10 are put into an oven to have the resin carried by the fiber cured to a B-stage. The iron core 10 is then removed by a rapping device to leave a long hollow cylindrical configuration having inner arc shells 11, an inflatable bladder and an outer wound fiber. The arc shells 11 is then extracted to leave a final cylindrical strip with the wound fiber encapsulated around the inflatable bladder. After putting the final cylindrical strip into an open mold and closing the mold, one may blow air into the final cylindrical strip to pressurize, heat and cure the product. Even though the iron core 10, the arc shells 11 and the inflatable bladder can be designed specifically according to the size or outer diameter of a product, the design of the mandrel is very important due to the fact that it is very difficult to strip off a mandrel which is tightly wound by fiber with a high tension. The prior art manufacturing process which uses an extractable mandrel can only strip off a mandrel by a rapping device and has the following defects:

1. It can only form a uniformly cross-sectional configuration;
2. It requires the use of a large number of iron cores and arc shells for mass production; and
3. It requires a rapping device which is costly.

SUMMARY OF THE INVENTION

An object of the present invention is to provide a mandrel assembly which has an outline that can be adapted to the requirement of a product.

Another object of the present invention is to provide a mandrel assembly which can be easily disengaged from a fiber wound on the mandrel assembly.

Another object of the present invention is to provide a mandrel assembly which is suitable for mass production.

In accordance with the present invention, a mandrel assembly includes a main tube having two ends each having an outer diameter, and two annular sleeves respectively sleeved on the two ends of the main tube. The annular sleeves having an inner diameter larger than the outer diameter of the two ends of the main tube so as to disengage from the main tube when applied with an external force. Each of the sleeves that has a taper ranged from 0.50 to 1.00 degree is formed into a truncated cone having a truncated end thereof facing outwardly when mounted on the main tube. The main tube is hollow and includes a middle hollow tube and two end connecting tubes which have an outer diameter smaller than the outer diameter of the middle hollow tube. The two annular sleeves are mounted on the two end connecting tubes, respectively. The middle hollow tube and the end connecting tubes are integrally assembled, and the middle hollow tube includes two tube segments detachably sleeved together.

In accordance with another aspect of the present invention, a mandrel assembly further includes two end shafts respectively mounted on the two ends of the main tube such that the mandrel assembly can be mounted in a winding machine. Each of the end shafts includes a locking end for engaging a connecting piece of the winding machine and an opposite pin end mounted on a clip of the winding machine. A mandrel assembly further includes an end shaft and a nozzle respectively detachably mounted on the two ends of the main tube such that the mandrel assembly can be mounted on a winding machine.

In accordance with the present invention, the main tube is provided with a plurality of holes for discharging air blown into the main tube through the nozzle. The truncated end of each sleeve has a flange adapted to be engaged by a tool so that each sleeve can be pulled out from the main tube upon releasing the mandrel assembly. Preferably, the sleeves are formed by winding a metal filament on a sleeve body which is made of compressible material such as rubber, plastic, or paper. The length of the sleeves is in the range of from 80 mm to 150 mm. A preferable length of the sleeves is about 100 mm. A taper of the annular sleeves is ranged from 0.50 to 1.00 degree, and a preferable taper of the sleeves is about 0.75 degree. The inner diameter of the annular sleeve is larger than the outer diameter of the main tube.

In accordance with another aspect of the present invention, the mandrel assembly further includes a shell surrounding the main tube in order to increase an inner diameter of a product to be manufactured by the mandrel assembly. The shell includes a plurality of arc pieces, e.g., two hemicylindrical arc pieces.

In accordance with another aspect of the present invention, the main tube and the two annular sleeves are integrally formed. A main tube has two tube segments which are sleeved together and has a gradually outwardly expanding outer diameter. The main tube includes a middle hollow tube and two end connecting tubes which have an outer diameter smaller than that of the hollow tube and mount respectively thereon the two annular sleeves. Further, the main tube includes two end shafts respectively mounted on the two ends of the main tube in order that the mandrel assembly can be mounted in a winding machine.

In accordance with the present invention, a method for making a hollow product includes steps as follows:

a) providing a mandrel assembly including a main tube and two annular sleeves sleeved on the two ends of the main tube;

b) winding a fiber on the mandrel assembly;

c) disengaging at least one of the two annular sleeves from the main tube;

d) detaching the wound fiber from the main tube; and e) shaping the wound fiber.

In accordance with the present invention, a method of making a hollow product further includes after the step a) a step of sleeving an inflatable bladder on the main tube and a step of wetting the fiber in a resin before winding the fiber on the mandrel assembly. The step e) is to heat the wound fiber until the resin carried by the fiber reaches a B-stage and to pressurize and heat the wound fiber in a closed mold in order to produce the hollow product. Consequently, a method for making hollow products includes steps of providing a main tube which has a plurality of holes and two end sleeves for mounting to two annular sleeves, mounting the main tube on a winding machine, winding a resin impregnated fiber on the main tube, mounting an air nozzle at one of the two ends, blowing air through the nozzle to disengage at least one of the annular sleeves from the main tube, disengaging the wound fiber with the main tube, curing the resin impregnated on the wound fiber, and shaping the wound fiber in a closed mold to form the follow product.

The present invention can best be understood through the following description with reference to the accompanying drawings, in which:

DETAILED DESCRIPTION OF THE INVENTION

Figure 2A:
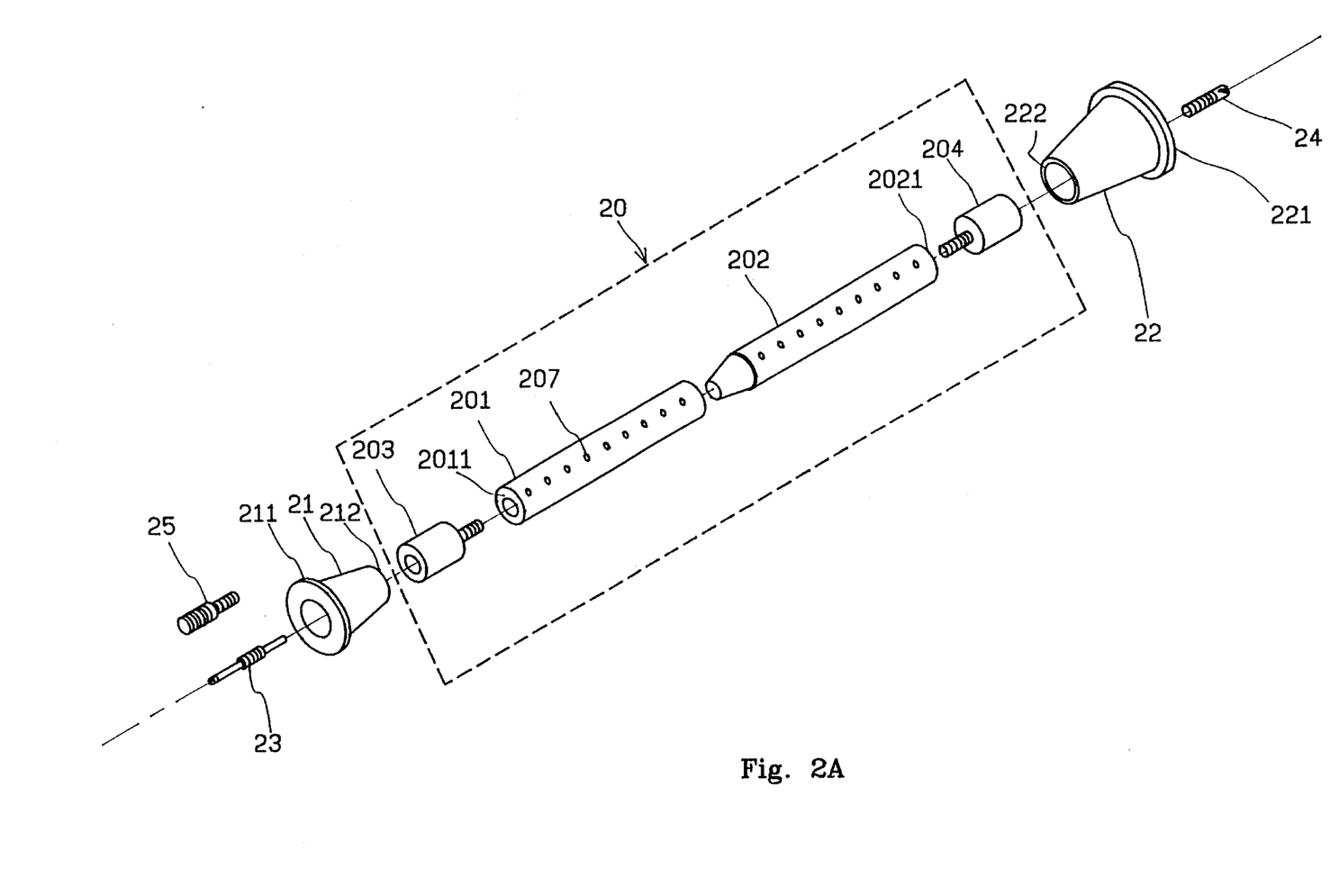
FIGS. 2(A) and (B) are a schematic view and a top view respectively showing a preferred embodiment of a mandrel assembly of the present invention.

Referring to FIG. 2(A), a preferred embodiment of a mandrel assembly according to the present invention includes a hollow main tube 20 having two middle hollow tubes 201 and 202 which respectively include a plurality of holes 207 and taperingly and mutually sleeve together to form an integral piece, two end connecting tubes 203 and 204 having an outer diameter smaller than that of the two middle hollow tubes 201 and 202 respectively screwed to or taperingly sleeved on the two ends of the middle hollow tubes 201 and 202, two annular sleeves 21 and 22 formed into a truncated cone and preferably having a taper ranged from 0.5 to 1.0 degree, a length determined according to the diameter and length of the product to be produced, and two flanges 211 and 221 respectively fixed on the outwardly faced ends thereof when respectively sleeved on the two end connecting tubes 203 and 204 to respectively contact with the two middle hollow tubes 201 and 202, wherein the outer diameter of the smaller end 212 (222) of each of the two annular sleeves 21 and 22 equals to the outer diameter of the two ends 2011 and 2021 of the two middle hollow tubes 201 and 201, an end shaft 23 having a thread on its one end for screwing to the end connecting tube 203, having the other end thereof mounted on a clip of a winding machine, and having a through shaft hole communicating with the end connecting tube 203 for passing therethrough blown air, a locking end 24 having a thread on one end thereof for screwing to the end connecting tube 204 and an positive pin end to be mounted on a clip of a winding machine, a nozzle 25 having a thread on one end thereof for screwing to the end connecting tube 203 and the other end thereof connected to an air source, and at least a set of arc shells 26, e.g., three cylindrical are shells, surrounding at least a portion of the middle hollow tube 201 and/or the middle hollow tube 202 so as to increase an outer diameter of the surrounding portion.

Figure 2B:
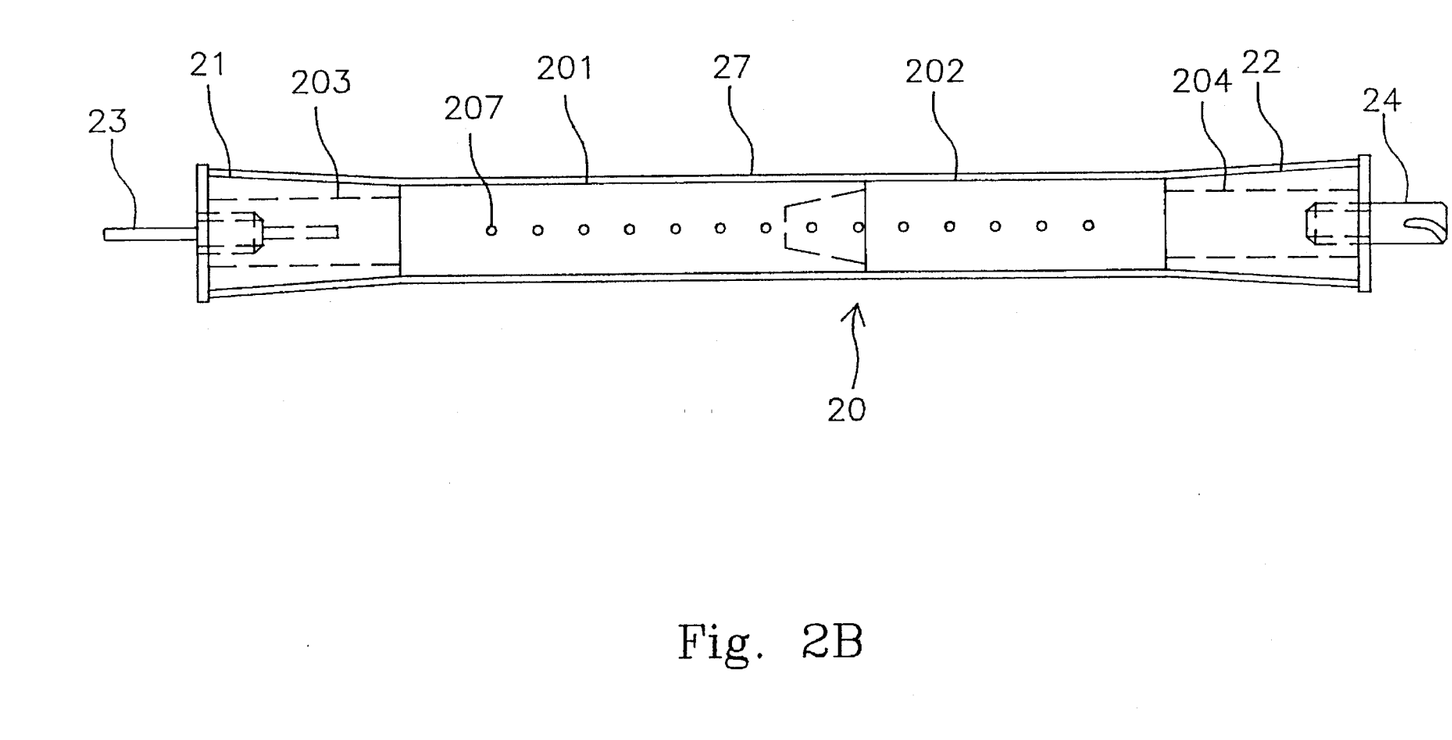
Figure 3:
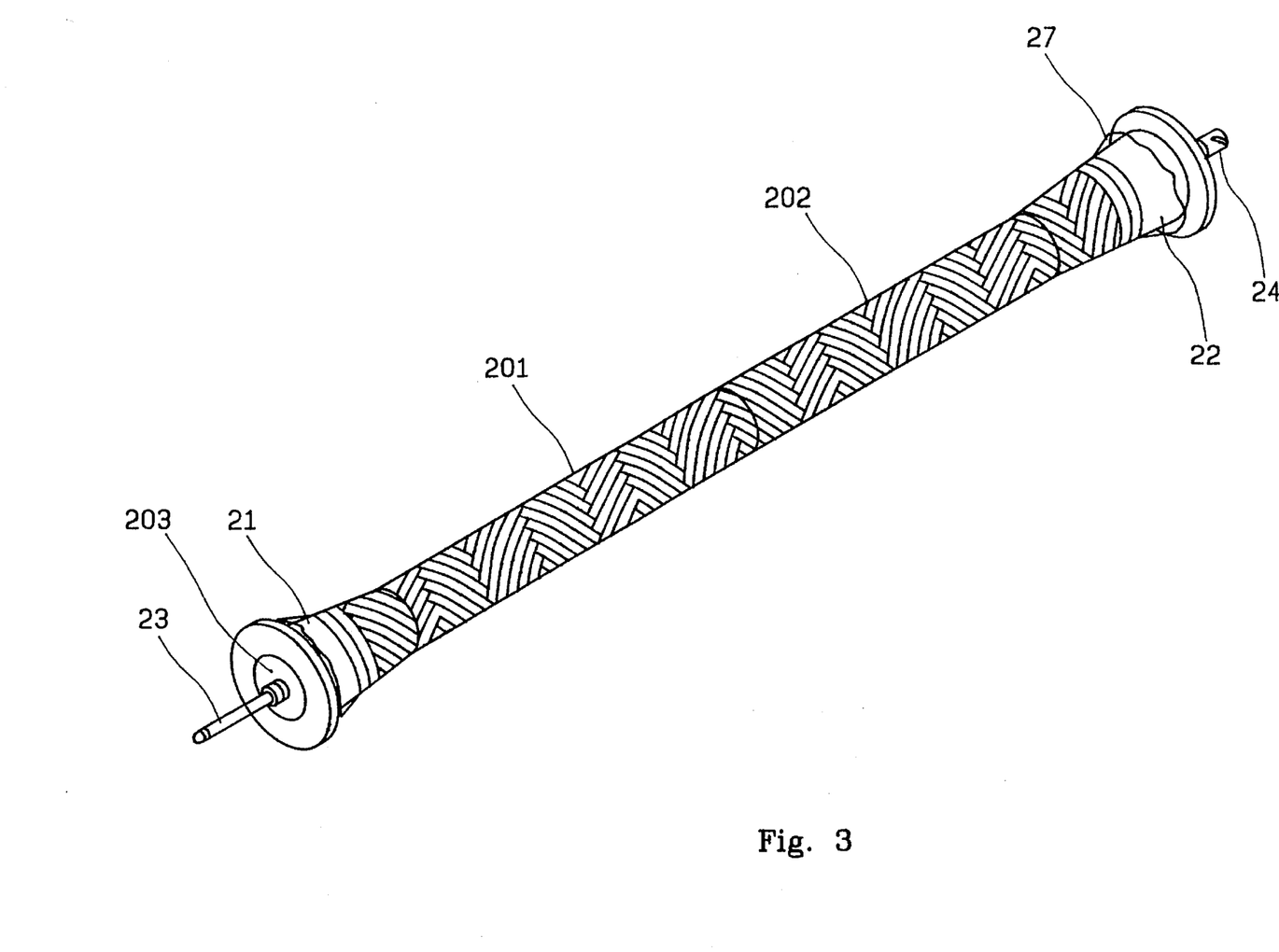
FIG. 3 is a schematic view showing a fiber wound on a preferred embodiment of a mandrel assembly shown in FIGS. 2(A) and 2(B).
Figure 4:
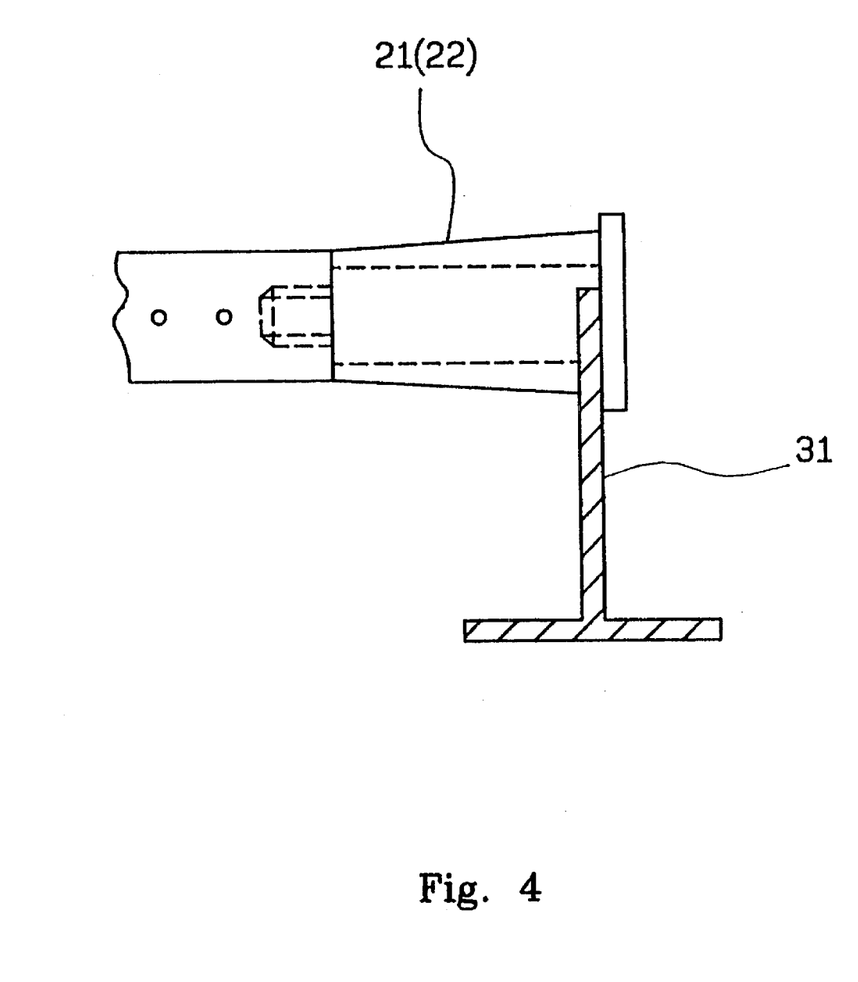
FIG. 4 is a schematic view showing a preferred embodiment of an annular sleeve and its auxiliary tool according to the present invention.

To assemble the mandrel of the present invention is to sleeve together the two middle hollow tubes 201 and 202, respectively, to mount the two end connecting tubes 203 and 204 to the ends of the two middle hollow tubes 201 and 202 and to sleeve thereon the two annular sleeves 21 and 22, to sleeve an inflatable bladder 27 on the middle hollow tubes 201 and 202 when the product to be produced requires blown air in order to be formed, to screw respectively the end shaft 23 and the locking end 24 to the two end connecting tubes 203 and 204 as shown in FIG. 2(B), and to mount the mandrel assembly on a winding machine to wind the fiber in a pattern. The fiber (a carbon fiber or a glass fiber usually) is wetted in a resin before it is wound on the mandrel assembly. The two annular sleeves 21 and 22 are shaped like truncated cones because at the two ends of the main tube 20 where the winding procedure is backed, the fiber is usually more tightly wound, so as to allow the easy strip-off of the two annular sleeves 21 and 22. Further, the wound fiber has a wider opening on each of its two ends to facilitate disengagement from the main tube 20. Referring to FIG. 3, to release the mandrel assembly, one replaces the end shaft 23 with a nozzle 25 for blowing air therethrough into the two middle hollow tubes 201 and 202 having a plurality of holes 207 for detaching the inflatable bladder 27 and the wound fiber from the mandrel assembly and disengaging at least one of the two annular sleeves 21 and 22. If one of the two annular sleeves 21 and 22 is not disengaged, one may pull off the annular sleeve by hand when the tension of the wound fiber is small. When the tension is large, one may engage one of the sleeve flanges 211 and 221 by an auxiliary tool, e.g., a table brim or a fixing ring 31, to strip off the two annular sleeves 21 and 22 as shown in FIG. 4. After the mandrel assembly is disengaged from the winding machine and the annular sleeves 21 and 22 are stripped off, the two end connecting tubes 203 and 204 are exposed. Since the end opening of the wound fiber is larger than the outer diameter of the two connecting tubes 203 and 204 and further that, the inflatable bladder 27 and the wound fiber are detached from the mandrel assembly, the main tube 20 can be easily stripped off through one end of the wound fiber or through two ends of the wound fiber by separating the main tube 20 into two middle hollow tubes 201 and 202. One may alternatively disengage one of the two connecting tubes 203 and 204, and take off the corresponding annular sleeve 21 or 22 to expose the inflatable bladder 27, and blow air into the inflatable bladder 27 by closing one of the two inflatable bladder ends to disengage the wound fiber together with the inflatable bladder 27 from the mandrel assembly. Finally, the wound fiber is placed in an oven until the resin carried on the fiber reaches the B-stage, and then pressurized by blown air and heated in a closed mold in order to produce a hollow product.

In the present invention, there are several preferred embodiments for releasing a mandrel assembly in order to satisfy various process requirements. For example, in the above-mentioned preferred embodiment for winding a fibrous cylinder, one can strip off the mandrel assembly by first disengaging from the mandrel assembly the two annular sleeves 21 and 22 without blowing air so that the plurality of holes 207 on the two middle hollow tubes 201 and 202 are not necessary. This is possible when the tension of the wound fiber is very low. The two middle hollow tubes 201 and 202 may be integrally formed, and/or the two connecting tubes 203 and 204 may be integrally formed respectively with the two middle hollow tubes 201 and 202. One may also apply forces on the two connecting tubes 203 and 204 respectively to separate the two middle hollow tubes 201 and 202 with the assistance of blown air to reduce the friction between the wound fiber and the mandrel assembly when the tension of the wound fiber is high. In this situation, the two connecting tubes 203 and 204 can still be integrally formed with the two middle hollow tubes 201 and 202.

Figure 5A:
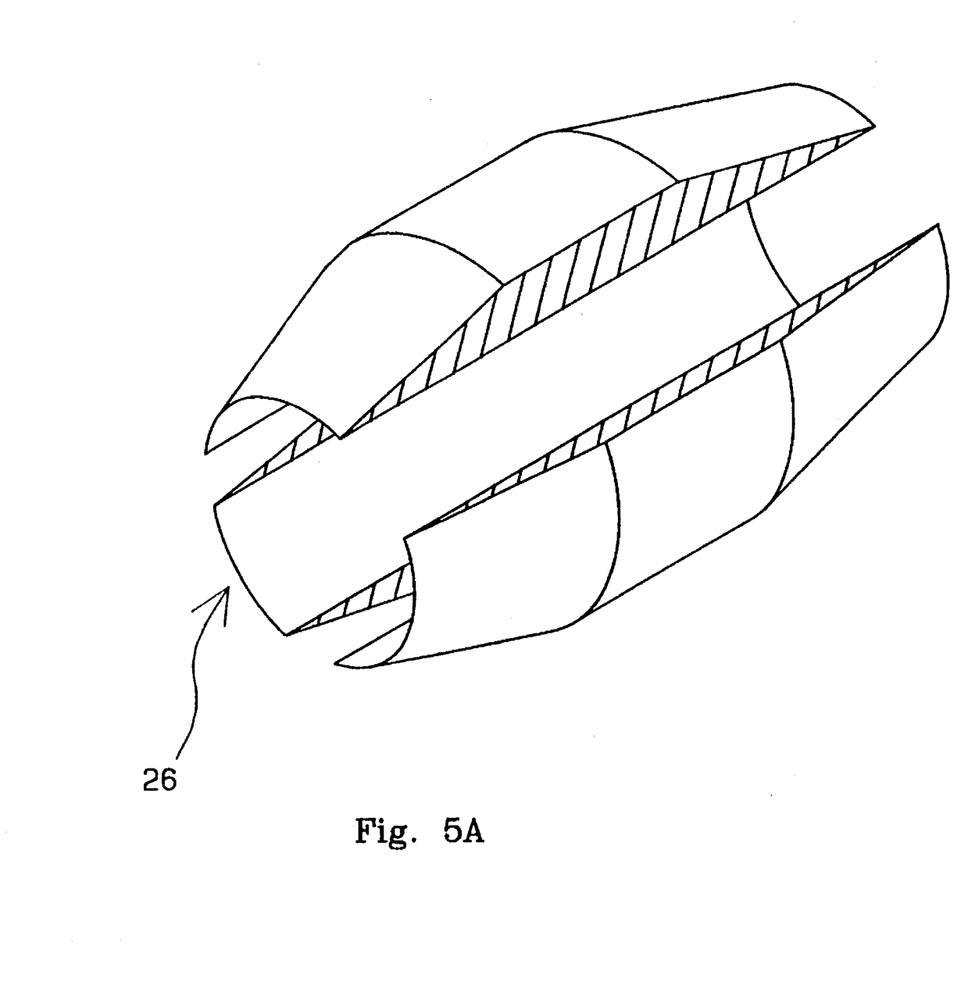
FIGS. 5(A) and 5(B) are a schematic view and a side view respectively showing a preferred embodiment of the arc shells before and after assembly according to the present invention.
Figure 5B:
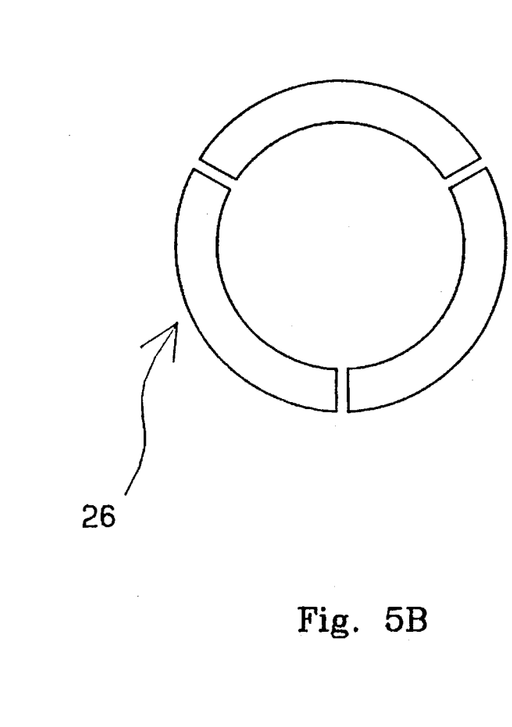

Referring to FIGS. 5(A) and 5(B), where a mandrel assembly is used for a product that has a non-uniform cross section including a middle portion that has a larger diameter, one may incorporate a set of arc shells 26 on top of the two middle hollow tubes 201 and 202 to increase the outer diameter of the middle portion and to wind a fiber on the inflatable bladder 27 sleeved over the mandrel assembly. The set of arc shells includes a plurality of arc sheets 26, e.g., either three arc shells or alternatively two hemi-cylindrical arc shells. To release the mandrel assembly, one may disengage the two annular sleeves 21 and 22 and the main tube 20 by using the previously disclosed method, and then disengage the three arc shells 26 by shaking. One may optionally decide the use of a plurality of holes 207 on the two middle hollow tubes 201 and 202. The two middle hollow tubes 201 and 203 are integrally formed. The two connecting tubes 203 and 204 are integrally formed with the two middle hollow tubes 201 and 202, respectively according to the tension of the wound fiber on the mandrel assembly.

When the mandrel assembly is used for a product that has a non-uniform cross-section, i.e. a middle portion having a diameter smaller than the diameter of its two ends, the middle hollow tubes 201 and 202 are shaped to adapt to the varying diameter of the product. An inflatable bladder 27 is then sleeved over the mandrel assembly. To release the mandrel assembly, one may disengage the two annular sleeves 21 and 22 by using the previously disclosed method, and then pull the two ends of the connecting tubes 203 and 204 to separate and disengage the middle hollow tubes 201 and 202. Ohe may optionally use a plurality of holes 207 on the middle hollow tubes 201 and 202 The two connecting tubes 203 and 204 are integrally formed with the two middle hollow tubes 201 and 202, respectively according to the tension of the wound fiber on the mandrel assembly.

Figure 6:
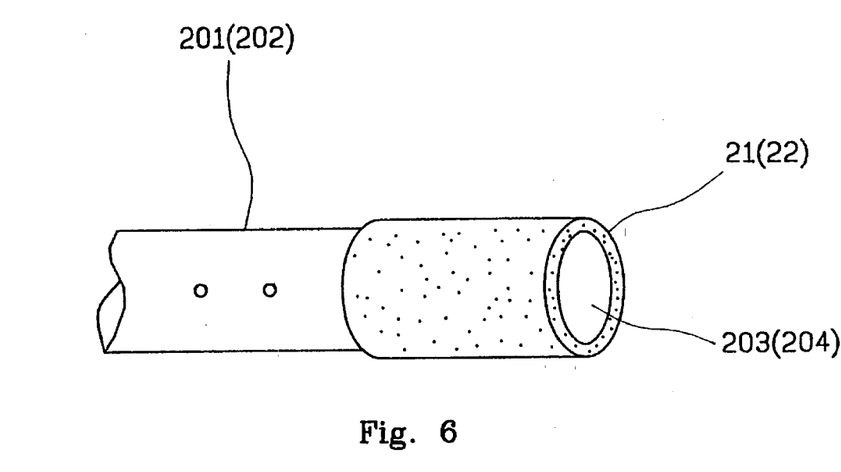
FIG. 6 is a schematic view showing another preferred embodiment of the annular sleeve of the present invention.
Figure 7:
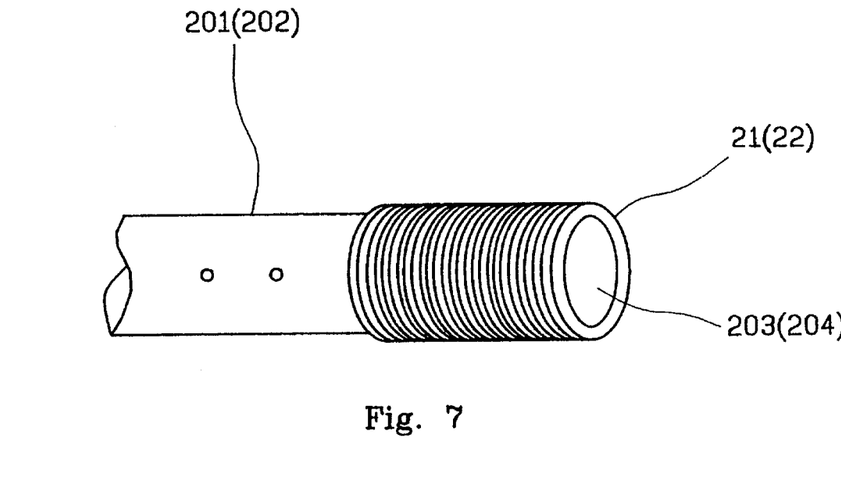
FIG. 7 is a schematic view showing further preferred embodiment of an annular sleeve of the present invention.

Except for the disengagement of at least one of the two annular sleeves 21 and 22 and the main tube 20, if the annular sleeves 21 and 22 are made of a compressible material, i.e. a rubber or a plastic (as shown in FIG. 6) a papery material, or wound with a metal filament (as shown in FIG. 7), it is not necessary to form the annular sleeves 21 and 22 in a truncated cone since it is easy to disengage the annular sleeves 21 and 22 from the middle hollow tubes 201 and 202 after the connecting tubes 203 and 204 are first stripped off. The outer diameter of the annular sleeves 21 and 22 is larger than that of the middle hollow tubes 201 and 202 when the annular sleeves 21 and 22 are sleeved on the connecting tubes 203 and 204, respectively such that they may be connected to the middle hollow tubes 201 and 202 for easy disengagement from the main tube 20 due to the larger opening of the wound fiber. To release the mandrel assembly, one may first disengage the connecting tubes 203 and 204 because the annular sleeves 21 and 22 are elastic and then disengage the two annular sleeves 21 and 22. For example, a plastic or a papery annular sleeve can be slightly compressed and pulled out, while a wound fiber can be disengaged after the disengagement of a metal filament wound annular sleeve. In this situation, the middle hollow tubes 201 and 202 can be integrally formed.

Figure 8:
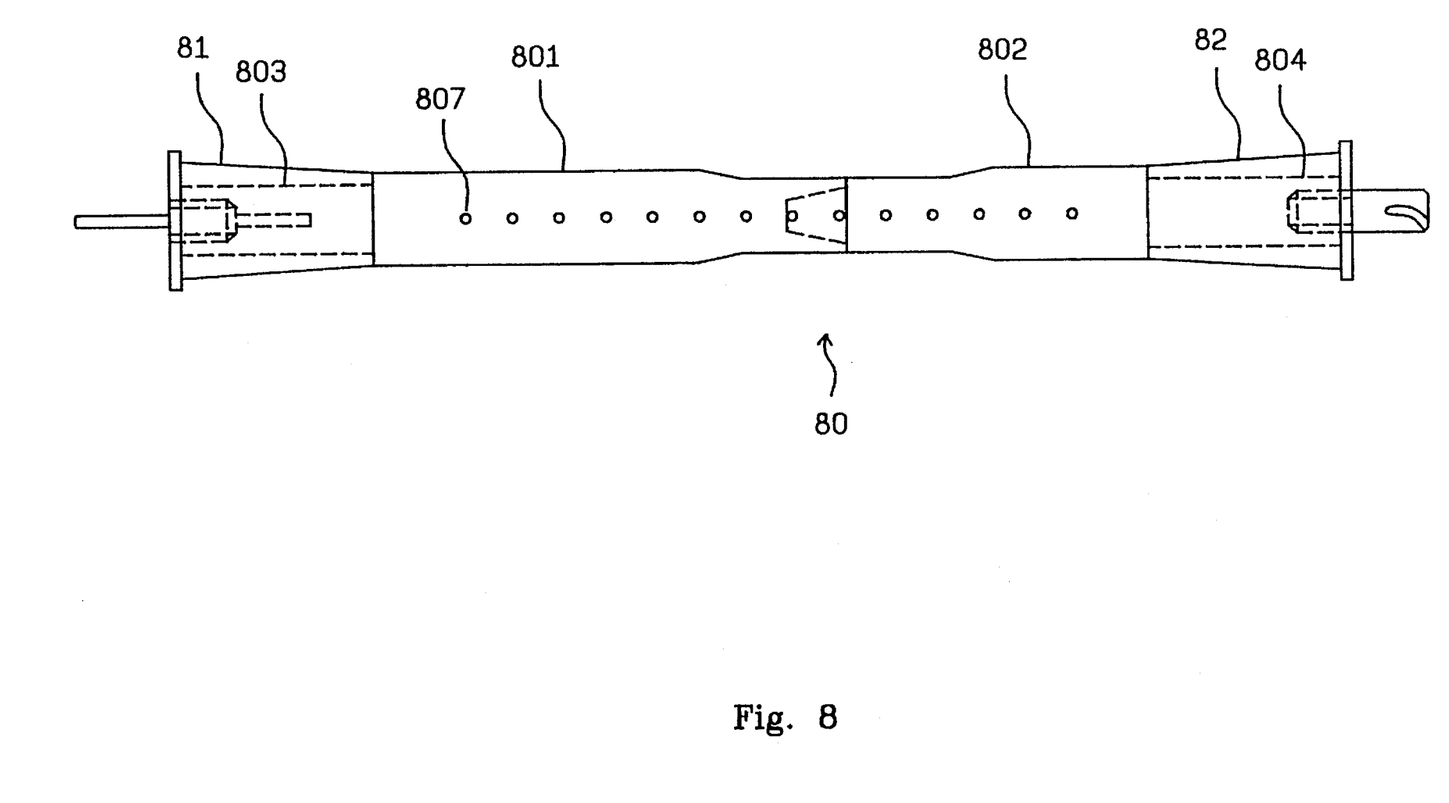
FIG. 8 is a schematic view showing another preferred embodiment of the mandrel assembly of the present invention.

Referring to FIG. 8, which shows another preferred embodiment that has a non-uniform cross-section (with a thinner middle portion). The mandrel assembly can be released as follows:

1. Designing a size for the middle portion in the middle hollow tube 80 based on the product specification as shown in FIG. 8.

2. After winding, blowing air through a nozzle (at a pressure of about 2 Kg/cm$^2$) and holes 807 to slightly inflate the wound fiber. Pulling off the annular sleeves 81 and/or 82 if they are not automatically ejected by the blown air; and 3. Disengaging the annular sleeves 81 and 82 to expose the connecting tubes 803 and 804 out of the wound fiber and simultaneously, disengaging the middle hollow tubes 801 and 802 from the ends of the hollow tube 80 based on a smaller tension between the middle hollow tubes 801 and 802 and the wound fiber so as to complete the mandrel assembly release.

In the above preferred embodiment, the connecting tubes 803 and 804 can be mounted on the middle hollow tubes 801 and 802, respectively without a screw thread. When the tension of the wound fiber is very small, one may apply the above mandrel release method to automatically eject (or pull out manually) the annular sleeves 81 and 82 without the need of ventilating holes 807.

Figure 9:
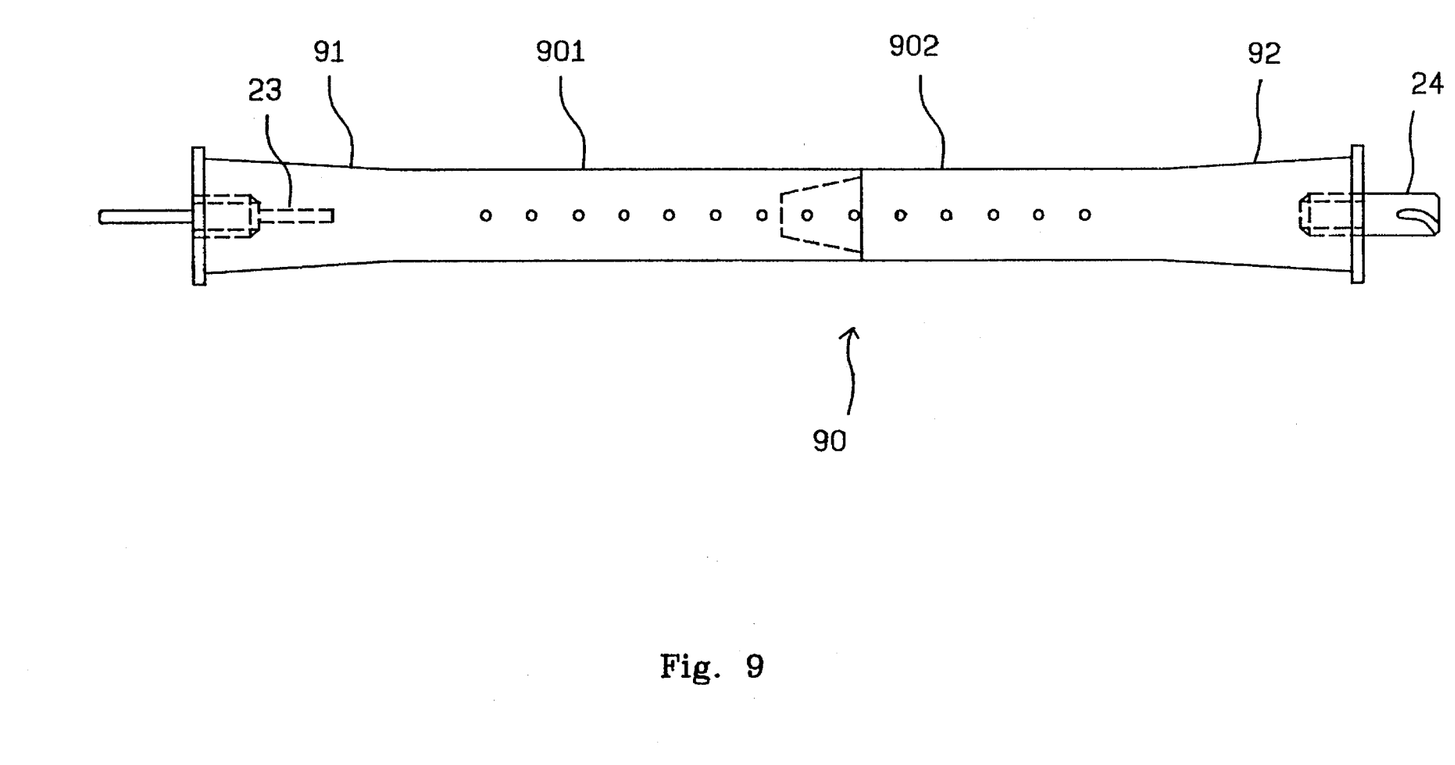
FIG. 9 is a schematic view showing a further preferred embodiment of the mandrel assembly of the present invention.

FIG. 9 shows another preferred embodiment, wherein the middle hollow tubes 901 and 902 and the annular sleeves 91 and 92 are integrally formed, respectively. Both of the middle hollow tubes 901 and 902 have a gradually expanding outer end. The main tube 90 thus includes two mutually sleeved middle hollow tubes 901 and 902 that have a truncated conical end. One may disengage the main tube 90 in the wound fiber and pull it out in order to complete the mandrel release.

An example of a manufacturing process for a tennis racket is illustrated for the present invention. After the number and thickness of the fiber layers are determined based on the appearance, size and configuration of the product required (e.g., six fiber layers and a thickness of 1–2 mm for each fiber layer), the size of each component of the mandrel assembly without an inflatable bladder can be calculated as follows:

Middle hollow tube: integrally formed to an outer diameter of 15.4 mm and to a total length of 1650 mm;

Hollow connecting tubes: integrally formed with the middle tube to an outer diameter of 13.4 mm and a length of 100 mm;

Truncated conical annular sleeve: formed to an inner diameter of 13.4 mm, to two end outer diameters of 15.4 mm and 18 mm, respectively and to a length of 100 mm;

End shafts: formed with an M6 screw thread, to lengths of 20 mm and 40 mm, respectively and to an outer diameter of 3.5 mm;

locking end: formed to 5/16 in.×18 pitch.

After the mandrel assembly is assembled and the inflatable bladder is sleeved over the mandrel assembly, the tension of the inflatable bladder is adjusted to fit the annular sleeves on the connecting tubes such that fiber can be wound in a predetermined pattern over the mandrel assembly. After the fiber is wound, air (at a pressure of about 2 Kg/cm$^2$) is blown through a nozzle to disengage at least one of the two annular sleeves to expose the two connecting tubes out of the wound fiber in order to remove the mandrel assembly. The annular sleeve is then pulled off to complete the removal of the mandrel assembly. Finally, the wound fiber together with the inflatable bladder is heated to about 80° C. to cure the resin carried on the fiber to B-stage, and then the wound fiber is heated to about 150° C. and pressurize by blown air in a closed mold to produce a tennis racket.

The range of the taper on the two annular sleeves 21 and 22 should be determined carefully. If the taper is too small, it would be difficult to release the mandrel assembly due to the large tension at the backing end of the wound fiber. If the taper is too large, the taper does not facilitate the release of the mandrel assembly because the fiber slides off the back end easily. The inner diameter of the annular sleeve should therefore match the outer diameter of the connecting tube at the hollow end and further, the diameter of the smaller end of the annular sleeve must equal to that of the middle hollow tubes 201 and 202. The taper of the two annular sleeves is dependent upon the two end diameters and the length thereof. Experiments show that the taper ranges from 0.50 to 1.00 degree, and 0.75 degree is a preferable taper. The length can suitably range from 80 mm to 150 mm, with 100 mm as a preferable value. The fiber back end may suitably be located at the middle portion of each of the annular sleeves 21 and 22 in order to determine the length of each of the middle hollow tubes 201 and 202 based on the product produced.

The present invention has the following advantages:

1. The mandrel assembly can be easily changed based on a desired product.
2. The mandrel assembly can be easily released;
3. The mandrel assembly can be used in mass production;
4. An inflatable bladder can be first installed before winding a fiber and then utilizing blown air, pressurization and heating for producing the product;
5. A low cost method is provided.
6. The mandrel assembly has a light weight and can be operated easily.

Since the present invention mandrel assembly is easy to release, to strip off or to disengage from a preformed wound fiber to allow the product to be placed in an oven to cure the resin to the B-Stage, the mandrel assembly can be readily reused in the next production cycle. Furthermore, the components of the present invention mandrel assembly are simple, lightweight and easy to manufacture. A total between five and ten mold assemblies would be sufficient for a mass production process. This affords the present invention a great operating economy and a mass production capability when compared to the prior art industrial techniques which require a much larger number of mold assemblies.

While the invention has been described in terms of what are presently considered to be the most practical and preferred embodiments, it is to be understood that the invention need not be limited to those embodiments disclosed. On the contrary, it is intended to cover various modifications and arrangements within the spirit and scope of the appended claims which are to be accorded with the broadest interpretation so as to encompass all such modifications and structures.

What is claimed is:

1. A mandrel assembly for making a hollow product comprising:

a hollow main tube provided with a plurality of holes for discharging air, and having two ends having an outer diameter for winding thereon a resin-impregnated-fiber; and two annular sleeves each shaped into a conical segment, respectively sleeved on said two ends of said hollow main tube to form a mandrel assembly, and each sleeve having having an inner diameter larger than said outer diameter of said two ends, whereby said two annular sleeves are disengaged from said hollow main tube when applied with an external force so as to thereafter detach said resin-impregnated-fiber from said mandrel assembly before cured.

2. A mandrel assembly according to claim 1, wherein an end of each of said sleeve having a larger diameter is located at the outermost end of said hollow main tube.

3. A mandrel assembly according to claim 2, wherein a taper of said each sleeve is ranged from 0.50 to 1.00 degree.

4. A mandrel assembly according to claim 1, wherein said hollow main tube includes a middle hollow tube and two end connecting tubes which have an outer diameter smaller than that of said middle hollow tube and mount respectively thereon said two annular sleeves.

5. A mandrel assembly according to claim 4, wherein said middle hollow tube sleeves thereto said connecting tubes.

6. A mandrel assembly according to claim 5, wherein said middle hollow tube and said connecting tubes are integrally formed.

7. A mandrel assembly according to claim 5, wherein said middle hollow tube includes two tube segments detachably sleeved together.

8. A mandrel assembly according to claim 1 further comprising two end shafts respectively mounted on said two ends of said hollow main tube in order that said mandrel assembly can be mounted on a winding machine.

9. A mandrel assembly according to claim 8, wherein each of said end shafts includes a locking end engaging with a connecting piece of said winding machine and an opposite pin end mounted on a clip of said winding machine.

10. A mandrel assembly according to claim 1 further comprising an end shaft and a nozzle respectively detachably mounted on said two ends of said hollow main tube in order that said mandrel assembly can be mounted on a winding machine.

11. A mandrel assembly according to claim 2, wherein side truncated end of said each sleeve has a flange adapted to be engaged to a tool so that said each sleeve can be pulled out from said hollow main tube upon releasing said mandrel assembly.

12. A mandrel assembly according to claim 1, wherein said sleeves are made of a compressible material.

13. A mandrel assembly according to claim 12, wherein said compressible material is one of rubber and plastics.

14. A mandrel assembly according to claim 12, wherein said compressible material is papery.

15. A mandrel assembly according to claim 1, wherein said sleeves are formed by winding a metal filament.

16. A mandrel assembly according to claim 3, wherein a length of said sleeves is ranged from 80 mm to 150 mm.

17. A mandrel assembly according to claim 16, wherein a taper of said sleeves is about 0.75 degree.

18. A mandrel assembly according to claim 17, wherein said length of said sleeves is preferably about 1.00 mm.

19. A mandrel assembly according to claim 4 further comprising a shell surrounding said hollow main tube in order to increase an inner diameter of a product to be manufactured by said mandrel assembly.

20. A mandrel assembly according to claim 19, wherein said shell includes a plurality of arc pieces.

21. A mandrel assembly according to claim 22, wherein said shell comprises two hemi-cylindrical arc pieces.

22. A mandrel assembly according to claim 1, wherein said main tube and said two annular sleeves are integrally formed.

* * * * *